M. D. CHRISTIN.
EGG BEATER.
APPLICATION FILED MAY 22, 1909.
938,369.
Patented Oct. 26, 1909.
2 SHEETS—SHEET 2.
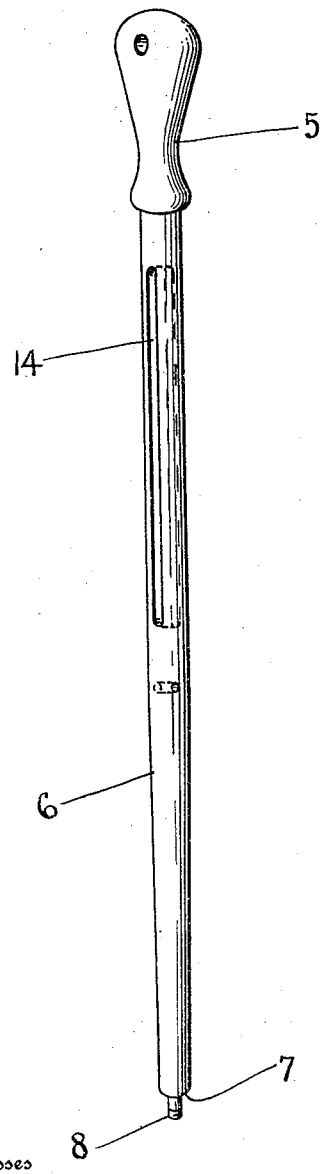
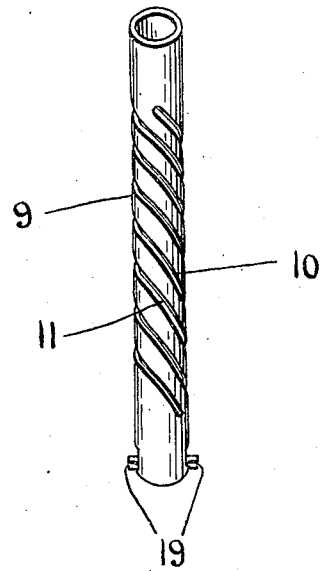
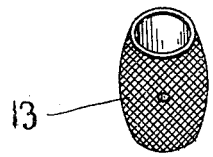
Witnesses
Inventor
Manuel D. Christin
By
Attorneys

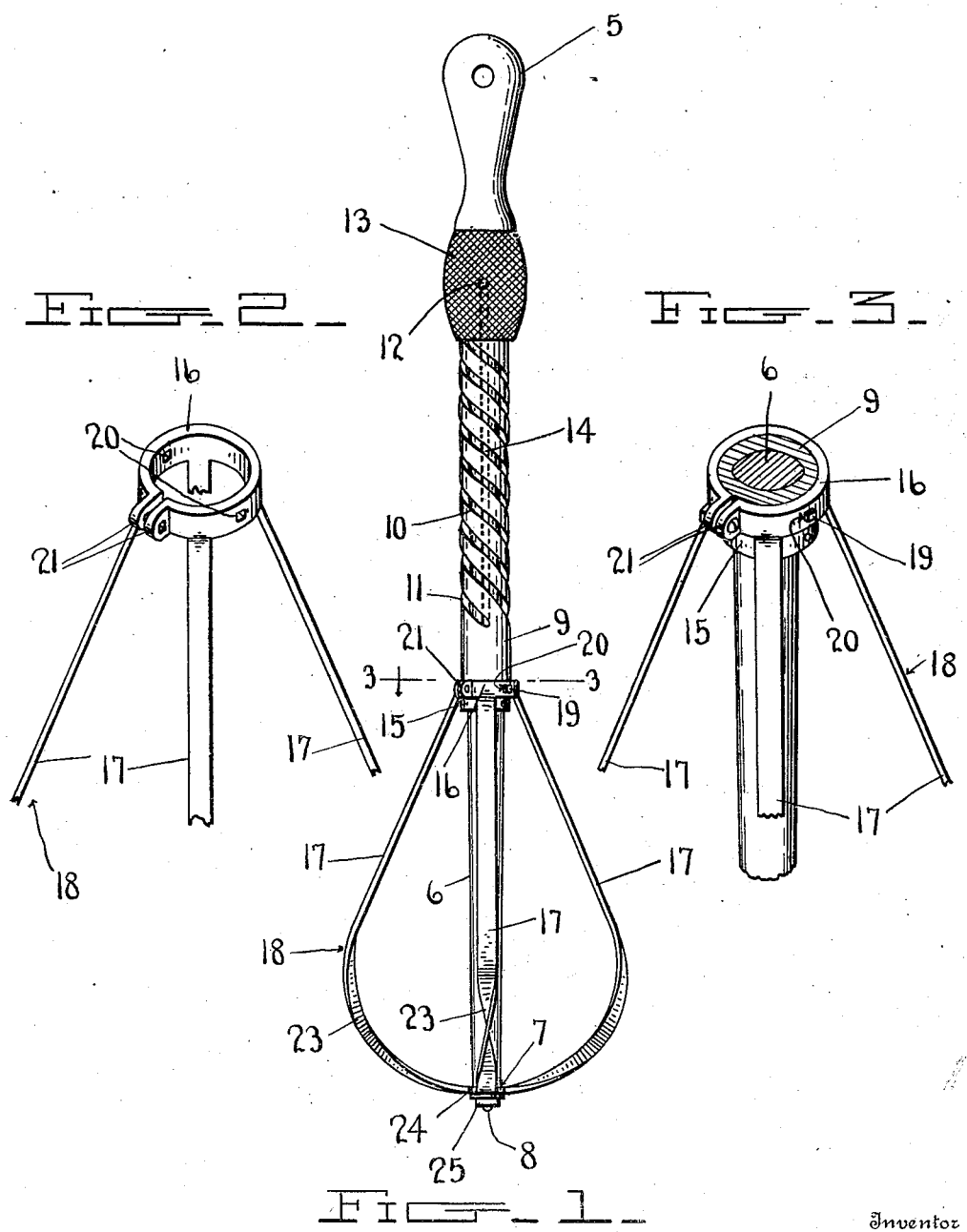

UNITED STATES PATENT OFFICE.

MANUEL D. CHRISTIN, OF LIBERTY, NEW YORK.

EGG-BEATER.

938,369.  Specification of Letters Patent.  Patented Oct. 26, 1909.

Application filed May 22, 1909. Serial No. 497,579.

*To all whom it may concern:*

Be it known that I, MANUEL D. CHRISTIN, a Greek citizen of Samos, in Turkey, residing at Liberty, in the county of Sullivan, State of New York, have invented certain new and useful Improvements in Egg-Beaters; and I do hereby declare the following to be a full, clear, and exact description of the invention, such as will enable others skilled in the art to which it appertains to make and use the same.

The invention relates to beaters and more particularly to the class of egg beaters.

The primary object of the invention is the provision of an egg beater in which a rotatable agitator member is actuated by a reciprocating handle, and in its manipulation the speed of the agitator member is increased or decreased at the will of an operator.

Another object of the invention is the provision of an egg beater in which a rotatable beater is so mounted to permit its removal at the will of an operator so that it may be cleaned.

A further object of the invention is the provision of an egg beater which is simple in construction, readily and easily operated, capable of being disassembled for cleaning when necessary and one that is inexpensive in the manufacture.

With these and other objects in view, the invention consists in the construction, combination and arrangement of parts, as will be hereinafter more fully described in detail, illustrated in the accompanying drawings which disclose the preferred form of embodiment of the invention, to enable those skilled in the art to manufacture the same and as set forth in the claims hereunto appended.

In the drawings:—Figure 1 is a side elevation illustrating the article as it is when ready for use. Fig. 2 is a detail perspective view of the upper end of the beater. Fig. 3 is a detail perspective view on the line 3—3 of Fig. 1. Fig. 4 is a detail perspective view of the shaft. Fig. 5 is a detail perspective view of the sleeve. Fig. 6 is a detail perspective view of the collar.

In this description similar reference characters denote similar parts throughout the several views in the drawings.

In the drawings, the numeral 5 designates a handle to which is secured in any suitable manner a longitudinally extending shaft 6, the lower or outer end of which is cut away to form a shoulder 7, and a threaded terminal 8, upon this shaft is rotatably secured a sleeve 9, through which is spirally cut slots 10 and 11. These slots are cut in parallel relation to each other thereby affording to a guide 12, a smooth and steady movement, which will result in an easy manipulation of the rotatable sleeve through the movement of a non-rotatable collar 13. This collar which is prevented from rotating by a slot 14, cut through the shaft, causes the rotatable sleeve to rotate by simply moving the same back and forth and the guide pin engaging in the spirals. This slot 14 guides the collar 13, in a longitudinal path upon the shaft, thereby it not being allowed to rotate, will cause the sleeve to receive rotary movement. As this collar 13 is moved from the top toward the lower end of the sleeve 13, its tendency is to force it off the shaft, but in this instance, to overcome such, there is provided a movable collar 15, on the shaft adjacent the lower end of the spiral sleeve. Adjacent the lower end of the spiral sleeve is provided a detachable collar 16, from which diverge arms 17, of the beater section 18. To prevent this section from slipping while in use, there is provided outwardly projecting lugs 19, on the rotatable sleeve 13 which engage recesses 20, formed in the collar portion 16. After these lugs 19, have been engaged in the recesses 20, the collar is tightened by a bolt or the like that passes through the projecting ears 21 formed integral with the collar. The arms 17, which are twisted as at 23, are then continued to a common center where they form a collar 24, that is passed over the terminal 8, and held thereon by a nut 25.

It is understood that certain minor changes and arrangement of parts can be made without departing from any of the principles set fort hin the appended claims.

What is claimed is:—

1. An egg beater comprising a lower rotatable beater section, an upper rotatable spirally cut section detachably secured thereto, a vertically traveling non-rotatable hand-grip, and a stationary longitudinal shaft provided with means whereby said hand-grip is vertically guided.

2. An egg beater comprising a vertical shaft, a hand-grip formed at the top, a reduced threaded pin at the lower end thereof, the lower end of a beater section loosely secured thereon, a plurality of partly twisted arms radiating therefrom, a collar forming the upper terminal of the arms, and having a plurality of perforations and means on said collar for tightening the same to the rotating means.

In testimony whereof, I affix my signature, in presence of two witnesses.

MANUEL D. CHRISTIN.

Witnesses:
E. R. KNIFFIN,
B. E. MISNUR.